Aug. 15, 1939    C. HOTCHKISS    2,169,696
ELECTRICALLY OPERATED HEATER CONTROL
Original Filed April 28, 1932    6 Sheets-Sheet 1

Inventor
CLIFFORD HOTCHKISS
By Paul, Paul & Moore
ATTORNEYS

Aug. 15, 1939     C. HOTCHKISS     2,169,696
ELECTRICALLY OPERATED HEATER CONTROL
Original Filed April 28, 1932    6 Sheets-Sheet 2

Inventor
CLIFFORD HOTCHKISS
ATTORNEYS

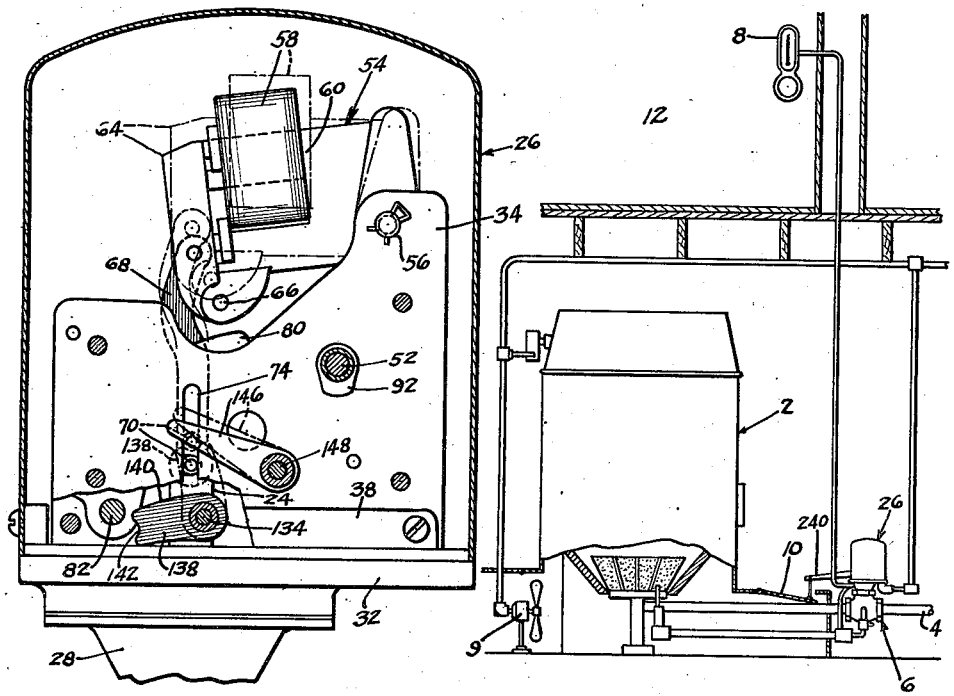
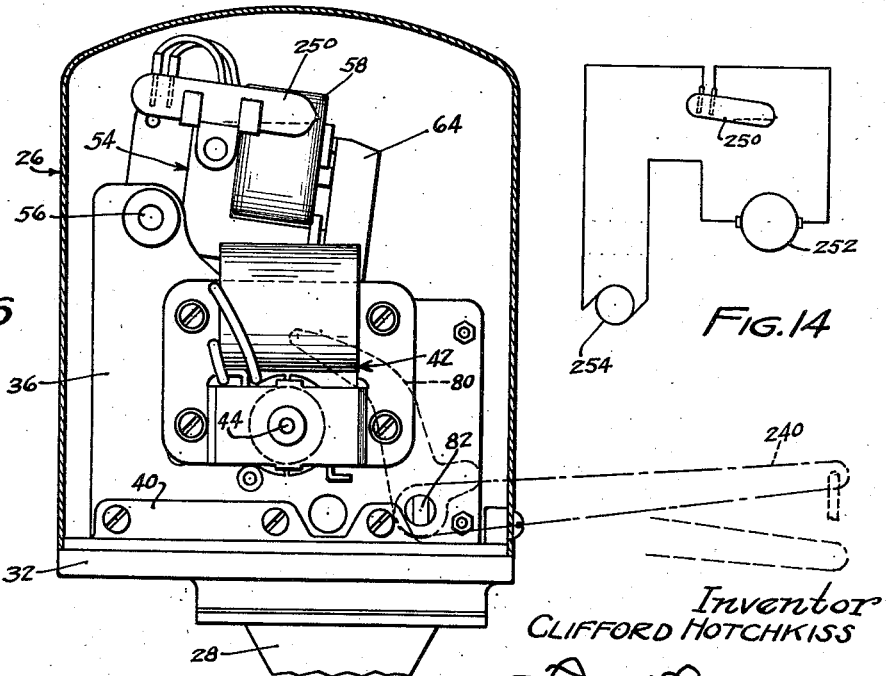

Aug. 15, 1939         C. HOTCHKISS         2,169,696
ELECTRICALLY OPERATED HEATER CONTROL
Original Filed April 28, 1932    6 Sheets—Sheet 4

Inventor
CLIFFORD HOTCHKISS
By Paul, Paul Moore
ATTORNEYS

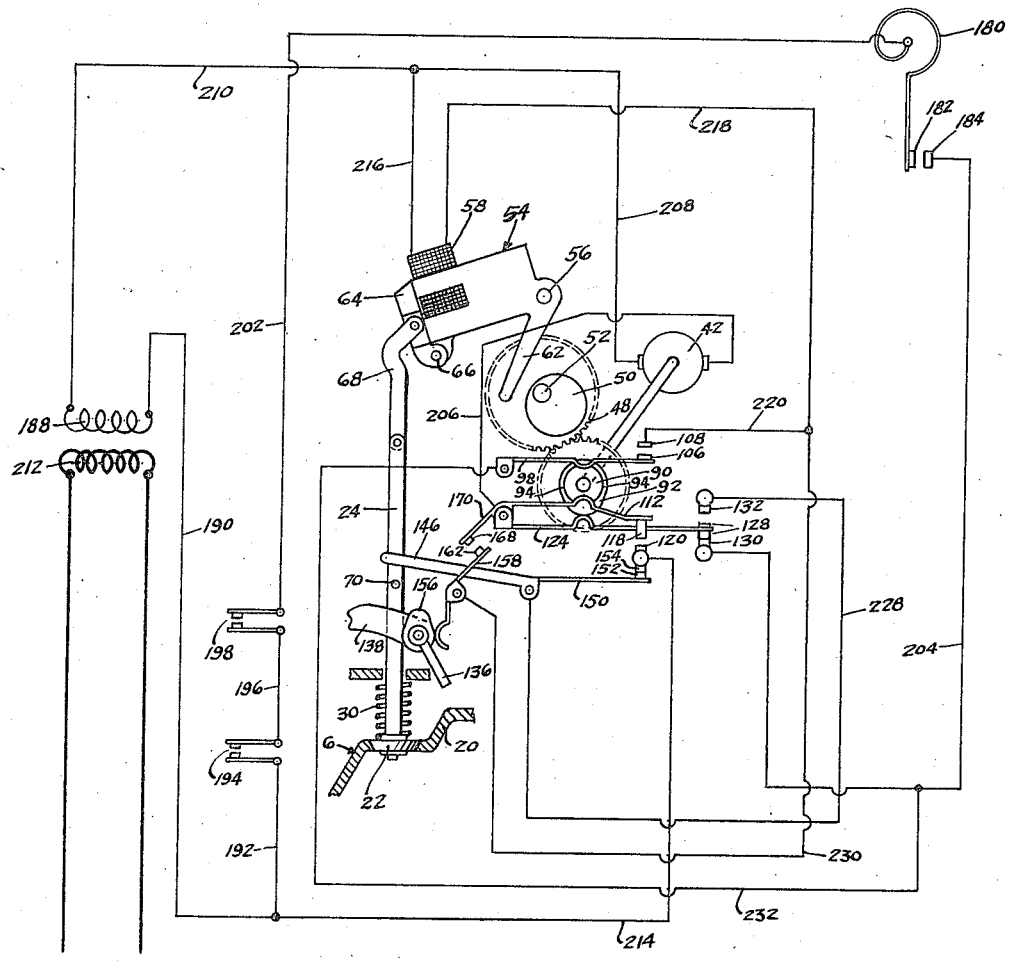
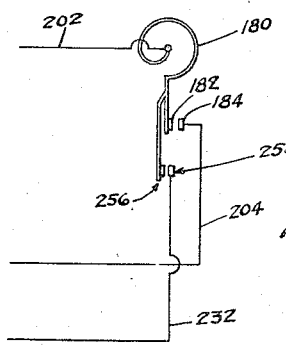
Fig.13
Fig.15
Inventor
CLIFFORD HOTCHKISS
By Paul, Paul Moore
ATTORNEYS Patented Aug. 15, 1939

2,169,696

UNITED STATES PATENT OFFICE 2,169,696

ELECTRICALLY OPERATED HEATER CONTROL

Clifford Hotchkiss, Bellwood, Ill., assignor to Minneapolis-Honeywell Regulator Company, Minneapolis, Minn., a corporation of Delaware

REISSUED

Application April 28, 1932, Serial No. 608,008
Renewed February 3, 1938

DEC 16 1941

29 Claims. (Cl. 236—1)

This invention pertains to electrically operated heater controls and relates more particularly to heat supply control valves. Such valves may be of the type located in the fuel supply line, may constitute dampers in the heater flues, or may be any desired type of valves for controlling the supply of heat by a heater to a given space.

In automatic heating systems it is customary to provide a thermally responsive device such as a bimetallic thermostat in the space to be heated, and associate with such thermostat means for operating the heater controls. Since these controls are ordinarily removed from the space to be heated and since the bimetallic thermostat is a relatively delicate instrument with little power, the means for operating the remotely located heater controls are ordinarily electrical rather than mechanical in nature and for purposes of safety, means must be provided for automatically placing the heat controls in minimum heat supply position, i. e. closed position, upon the occurrence of power failure. If such means were not provided it will be readily appreciated that the heater might become too hot and reach a dangerous temperature.

It has heretofore been the practice in automatic heat control systems of the type discussed above to bias the heat control member to a position in which it will cause the heater to supply a minimum amount of heat, and to move the member away from such minimum heat supply position to a maximum heat supply position by means of an electric motor, of any desired type, such as the conventional rotary or the solenoid type, which remains stalled in order to hold the heat control member in its maximum heat supply position. It is obvious that an appreciable waste of power occurs as a result of so holding the heat control member in maximum heat supply position. Also, the stalled motors become unduly heated during the holding period.

It is a general purpose of the present invention to provide an automatic heat control system wherein the heat control member is automatically returned to position in which it causes the heater to supply a minimum amount of heat upon power failure, but wherein it is not necessary to stall the operating motor in order to maintain the heat control member in maximum heat supply position.

In accordance with the invention there is provided a motor under the control of the room thermostat for supplying the necessary power to move the valve away from its position in which it causes the heater to supply a minimum amount of heat. This motor cooperates with an electromagnet to position the valve so as to cause the heater to supply a maximum amount of heat and the arrangement is such that when the valve is open, the motor will be de-energized but the electro-magnet will be energized and will be operative to maintain the valve in open position. Upon the occurrence of a power failure the electro-magnet will of course become deenergized and will permit the valve to move to its minimum heat supply position under the influence of either gravity or any desired type of biasing means which may be provided. Thus, the motor does not consume any current while the valve is being maintained in open position. The only current expended in order to hold the valve open is that consumed in the electro-magnet. Full safety upon the occurrence of power failure results and there is a minimum expenditure of power during operation.

Again, it is an object of the invention to provide a simplified and dependable system embodying the feature discussed above.

Where the heat supply control valve comprises a valve in the gas supply line of a gas heater, it is sometimes desirable to effect a quick closing of the valve and is sometimes desirable to effect a slow closing thereof, depending upon the particular type of burner or heater which the valve is controlling. It is a specific object of the present invention to provide a control system embodying the features discussed above, and which can also be selectively arranged to close the gas supply valve either quickly or slowly when the room thermostat indicates that the space to be heated has reached the desired temperature.

It is an additional object of the invention to provide a heat control system wherein the heat control valve closes automatically upon power failure but wherein the control of this valve by the room thermostat is resumed automatically upon the resumption of power.

Still another object of the invention lies in the provision of a heat control system wherein the heat control valve may be opened manually after power failure and wherein the control of the valve will be automatically taken over by the room thermostat upon the resumption of power, irrespective of the fact that the valve has been manually opened.

The various features and objects of the invention will become more readily apparent upon a detailed study of the accompanying drawings and specification together with the appended claims.

The drawings are merely illustrative of the invention and disclose the same as applied to a system for controlling a valve in the gas supply line of a gas heater. Figure 1 of the drawings is a longitudinal cross sectional view through the gas valve and mechanical operating mechanism associated therewith, the valve being shown in closed position under normal conditions of operation.

Figure 5 is a view along line 5—5 of Figure 3;

Figure 6 is a view along line 6—6 of Figure 3;

Figure 11 is a view diagrammatically showing the invention applied to a heating system including a gas-fired hot air furnace;

Figure 13 is another system diagram showing a two-wire thermostat and connections operative to cause the valve to close quickly upon the reaching of predetermined room temperature;

Figure 14 shows the circuit of the hot air circulating fan; and

Figure 15 is a fragmentary diagrammatic view of a modified form of control circuit.

Figure 1:
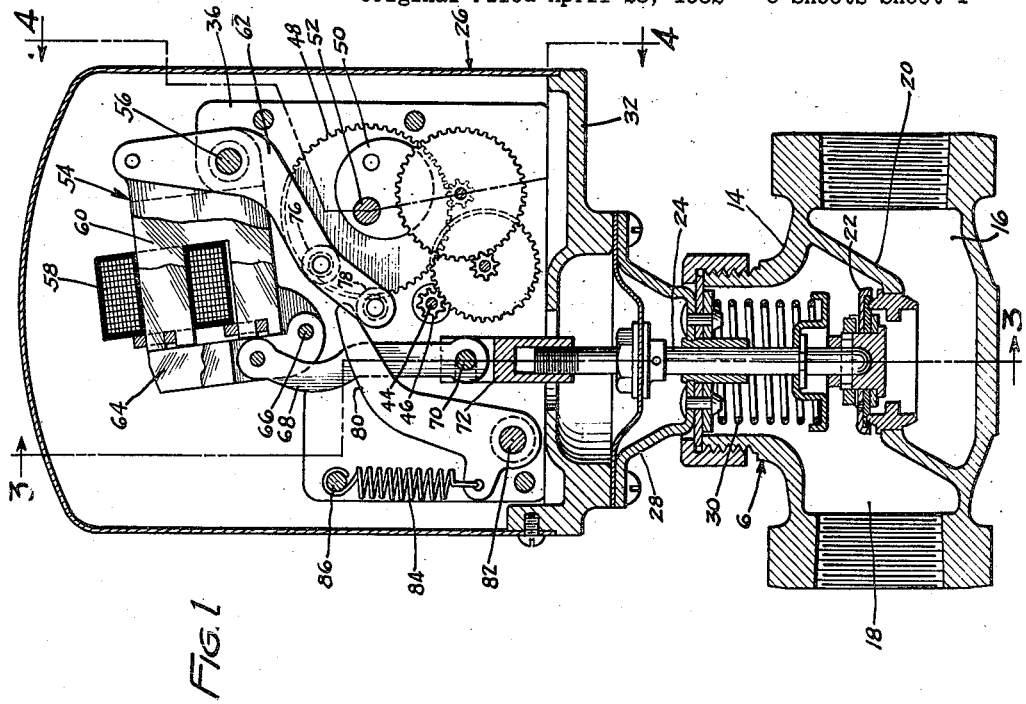

Referring to the drawings, the numeral 2 designates a gas-fired hot air heater having a gas supply line 4, in which is a valve generally designated at 6. A room thermostat indicated at 8 controls the valve 6 to regulate the supply of gas to the heater 2 and a warm air circulating fan 9 is placed in operation only while the valve 6 is opened to supply gas to the heater. A secondary air damper 10 controls the flow of air to the combustion chamber and is adapted to be open only when the valve 6 is open and vice versa since it is undesirable to circulate cold air through the combustion chamber when combustion is not taking place. The heater 2 is adapted to supply heat to a space 12 in which the room thermostat 8 is situated, all as shown in Figure 11.

Upon more particular reference to Figures 1 to 6, it will be seen that the valve 6 is provided with a casing 14 which forms an inlet chamber 16 and an outlet chamber 18 separated by a wall 20 having an opening therein provided with a seat for the valve member 22. The valve member 22 has attached thereto a stem 24 which passes upwardly out of the valve casing 14 and into a casing generally designated at 26 which houses the mechanism for positioning the valve member 22. The casing 26 is mounted above an annular support 28 which is fixed on top of the valve casing 14 and the usual means are provided for sealing the outlet chamber 18 of the valve casing. The valve is normally biased into closed position by means of the compression spring 30 as shown in Figure 1.

Casing 26 has a base portion 32 upon which are supported in upright position a pair of parallel longitudinally extending metallic plates 34 and 36. The plates 34 and 36 are secured to upwardly extending portions 38 and 40 which are formed integrally with the base 32, by means of suitable screws or bolts as shown. An electric motor 42 of the low voltage induction type is mounted on the side of the plate 36 and has an armature mounted on a motor shaft 44 which extends between the plates 34 and 36. The motor shaft 44 has fixed thereon a gear 46 which operates a gear train having at one end the gear wheel 48. This gear wheel 48 has fixed on one face thereof an eccentric or cam member 50 and is mounted upon a shaft 52.

An electro-magnet generally designated at 54 is pivoted upon a shaft 56 which is secured between the two metallic plates 34 and 36. This electro-magnet has an energizing coil 58 and a core 60 to which is fixed a depending arm 62 that is in the shape of a bell-crank lever. An armature 64 is pivoted to the electro-magnet as at 66 and is held adjacent the core 60 as shown in the full line positions in Figures 1 and 2 when the coil 58 is energized. A link 68 is pivoted at one end to the armature 64 and is pivotally connected at its other end to a pin 70 which is mounted transversely in a coupling member 72 having a threaded socket engaged by the upper threaded end of valve stem 24. The pin 70 is formed with reduced end portions which operate in oppositely disposed slots 74 formed in the metallic walls 34 and 36. One of these reduced end portions extends outside of the wall 34 for a purpose to be later described. The slots 74 are vertical and of just sufficient width to accommodate the reduced portions of the pin 70 and therefore serve as guides for the same.

The arm 62 which is fixed to the electro-magnet 54 has fixed thereto at one side a roller 76 lying in the path of the cam 50 and also has fixed thereto another roller 78 which is adapted to engage one arm of bell-crank lever 80 fixed on shaft 82. A spring 84 has one end secured to the other arm of bell-crank lever 80 and has its other end secured to a post 86 which is mounted between the metallic plates 34 and 36.

When the various parts are in the position shown in Figure 1, the valve is closed, the cam 50 is out of engagement with the roller 76 on the arm 62 of electro-magnet 54, and the bell-crank lever 80 is exerting a downward force upon the roller 78 under the tension of spring 84. This force tends to rotate the electro-magnet 54 in counter-clockwise direction, and thus serves to urge the electro-magnet and valve into down position, in which position the armature 64 is mechanically held in engagement with electro-magnet 54 due to the proportions and relative positions of the various parts. If the motor is started and operated sufficiently to move cam 50 into the position shown in Figure 2, the cam will engage roller 76 and rotate the electro-magnet 54 in clockwise direction thereby to raise its outer end to which the armature 64 is pivoted. Assuming that the coil 58 was energized during this movement of the cam, the armature 64 will remain in engagement with the core 60 and the parts will assume the relative positions shown in full lines in Figure 2. It will be noted that in this position the valve is fully open and cam 50 is on dead center with the result that the springs 30 and 84 cannot operate to return the valve and electro-magnet to the positions shown in Figure 1 even though no brake or other means for holding the motor against rotation are provided. During such rotation of arm 62 in clockwise direction and consequent opening of the valve, it will be observed that the shaft 82 will be simultaneously rotated in counter-clock-wise direction due to engagement of the bell-crank lever 80 by the roller 78.

Figure 2:
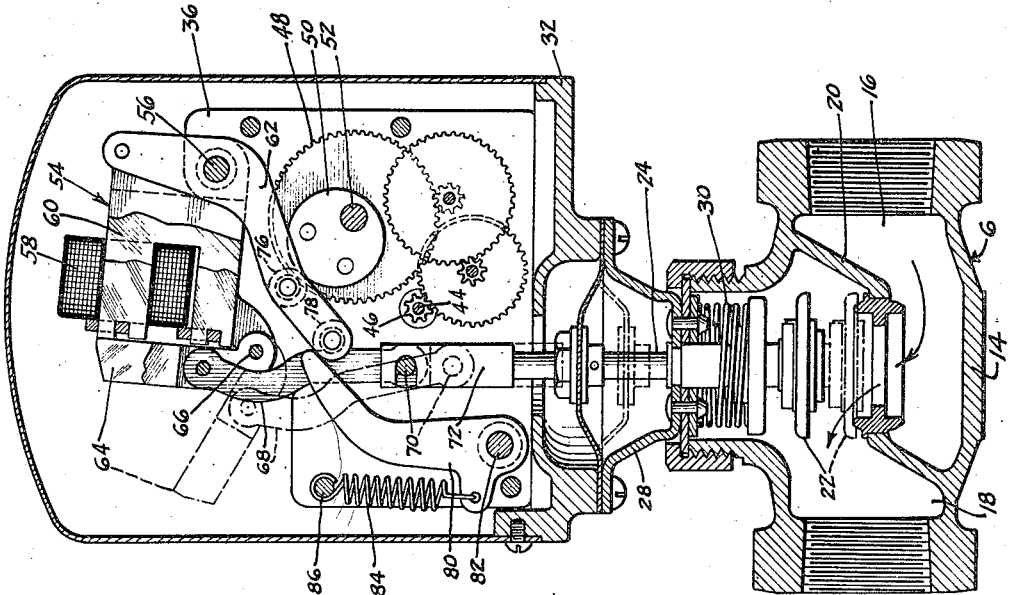
Figure 2 is a view similar to Figure 1 but showing the parts when the valve is open under normal conditions of operation.
Figure 3:
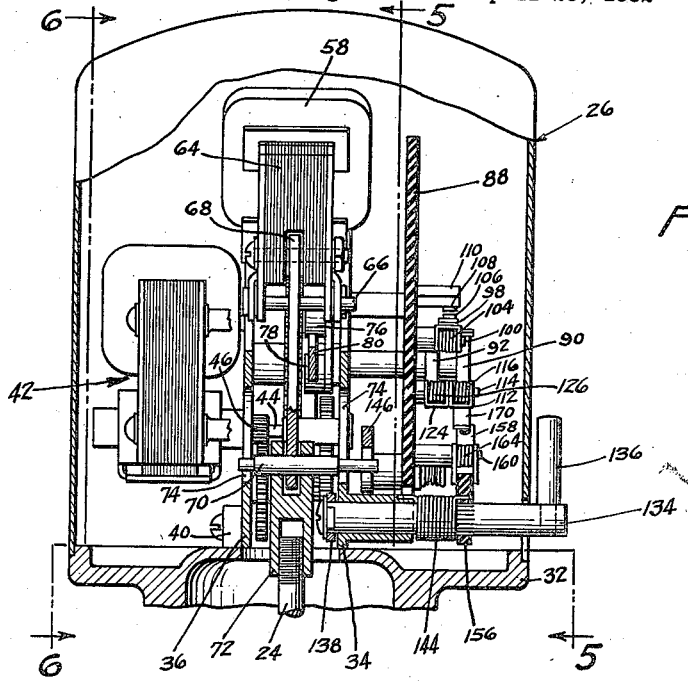
Figure 3 is a cross section along line 3—3 of Figure 1.
Figure 4:
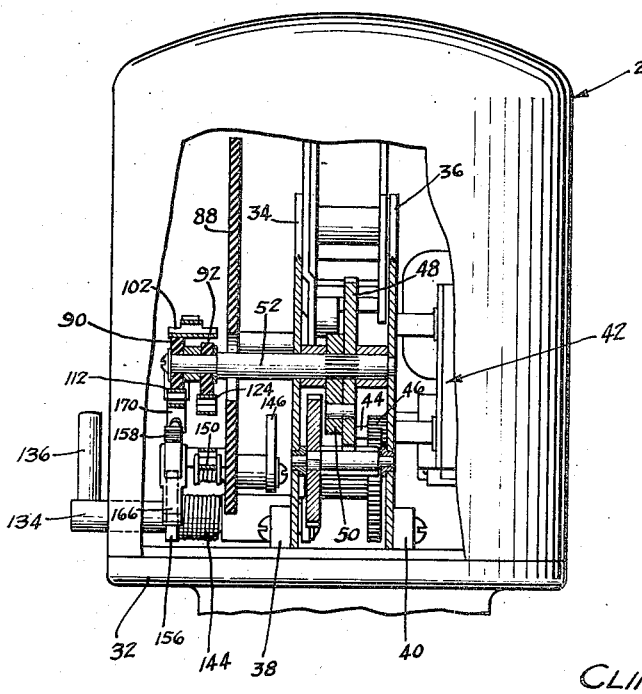
Figure 4 is a view along line 4—4 of Figure 1.

If failure of the power source occurs when the parts are in the full line position shown in Figure 2, the cam 50 and electro-magnet 54 will not move. However, the armature 64 will be released from the core 60 and the valve member 22 will be moved into closed position under the influence of spring 30, the parts assuming the positions illustrated in dotted lines in Figure 2. It is to be noted that the electro-magnet 54 is not sufficiently strong when energized to attract the armature to it from the dotted line position shown in Figure 2. However, the magnet is sufficiently strong when energized to retain the armature adjacent itself during movement of the valve from position shown in Figure 1 to that shown in Figure 2. If the parts are in the positions shown in dotted lines in Figure 2, and the motor is thereupon operated to move the cam 50 and electro-magnet 54 back to their positions shown in Figure 1, the armature 64 will be mechanically moved back into engagement with core 60 independently of whatever force the magnet 54 may exert upon the armature 64 when they are separated.

The shaft 52 of the gear wheel 48 extends through an opening in the metallic plate 34 and further extends through an opening in a panel board 88 of suitable insulating material. The end of shaft 52 which extends through the opening in the panel board 88 is reduced and has fixed thereto a pair of cams 90 and 92 as shown more clearly in Figures 4 and 7 to 10, inclusive. The cam member 90 has oppositely disposed concentric outer edges 94 which are separated by a pair of notches or recesses situated 180° apart. Cam 92 is of the simple type formed with a single off-center projection which is located at substantially the same distance from the center of shaft 52 as the outer concentric surfaces 94 of the cam 90. It is to be noted that this projection of cam 92 is co-incident with one of the notches in cam member 90 as will be evident from Figure 4.

Figure 8:
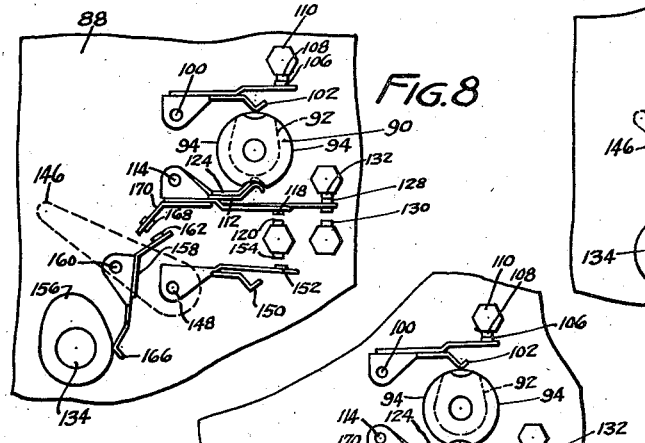
Figure 8 is a fragmentary view showing the positions of the contacts when the valve is open under normal conditions of operation.
Figure 9:
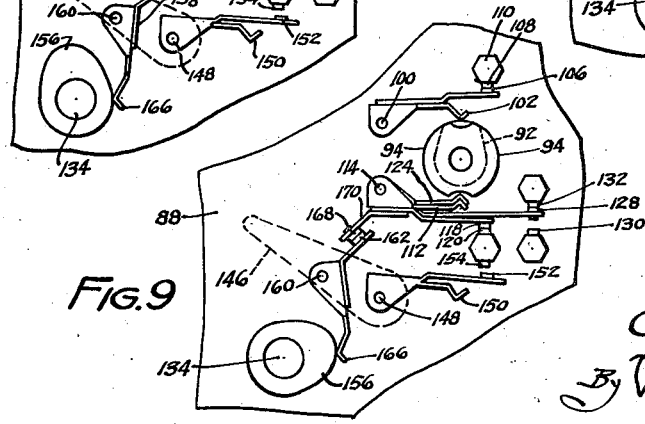
Figure 9 is a similar view showing the positions of the parts when power failure has occurred after the motor has positioned the operating cam to open the valve, and the valve has been manually opened.

An arm 98 is pivoted upon post 100 which is secured to the panel board 88 and has formed integrally at its outer end a cross piece 102 which is adapted to ride on the outer edge of cam member 90. The arm 98 is actuated towards cam member 90 under the tension of a spring 104 that is wrapped around post 100. A contact 106 is flexibly mounted upon the arm 98 and cooperates with a fixed contact 108 on the post 110. When the cross piece 102 lies in the notch of the cam member 90, which is remote from the projection of cam member 92, the contact 106 is separated from the contact 108 but when the cross piece 102 rides on one of the concentric edge surfaces 94, the contacts 108 and 106 engage. So also, the contacts 106 and 108 are in engagement when the cross piece 102 is engaged by the cam 92 as will be evident from Figures 8 and 9. A similar arm 112 is pivotally mounted upon the pin 114 and has its free end actuated to ride on the outer edge of cam member 90 by means of a spring 116. This arm 112 has flexibly mounted thereon a contact 118 which cooperates with a fixed contact 120 on the post 122. When the free end of arm 112 is located in one of the notches or recesses of cam member 90, contacts 118 and 120 are out of engagement but when this arm rides on one f the concentric surfaces 94, contacts 118 and 120 are moved into engagement. Pivoted on the pin 114 there is also an arm 124 whose free end is actuated to ride against the outer edge of cam member 92 by a spring 126 coiled about pin 114. This arm 124 has flexibly secured thereto a contact 128 which engages the fixed contact 130 when the parts are in the position shown in Figure 7 and which engages the fixed contact 132 when cam member 92 is moved 180° as shown in Figures 8 and 9. The cams 90—92 rotate 180° upon movement of the parts from the position shown in Figure 1 to that shown in Figure 2.

Means are provided for manually setting the valve in open position if the source of power fails for any reason. These means include a shaft 134 which extends outside of the case 26 and is provided with a handle 136. The shaft extends between the metallic plates 34 and 36 and has fixed at its end a lever 138 having a cam surface 140 and a notched end as indicated at 142 (see Figure 5). When the shaft 134 is rotated in clock-wise direction, looking at Figure 5, the cam surface 140 engages the pin 70 thereby to raise the same together with the valve stem 24 and the valve member 22. Continued rotation of the shaft 134 in clock-wise direction results in a seating of the pin 70 in the notched portion 142. When this occurs the parts retain themselves in the dotted line positions shown in Figure 5 and the valve is partially open. The valve can be closed by manually rotating the shaft 134 in counter-clock-wise direction to disengage the lever 138 from the pin 70.

It is to be noted that the shaft 134 is normally urged into the full line position shown in Figure 5 by the spring 144 and that the valve is only partially open and the free end of the electro-magnet 54 is only partially raised when the lever 138 is in the dotted line position shown in Figure 5. If the electro-magnet 54 is therefore raised to a point above the dotted line position shown in Figure 5, i. e. to the full line position shown in Figure 2, while the armature 64 is held thereby, it is obvious that the pin 70 will be moved up sufficiently far to release lever 138 whereupon the shaft 134 and lever 138 will be returned to full line position shown in Figure 5 under the action of spring 144. Thus the means for manually setting the valve in open position will be automatically released upon a raising of the valve to full open position by the motor and electro-magnet.

Whenever the pin 70 is raised, either upon opening of the valve by means of the motor in normal operation or upon a manually opening of the valve by means of handle 136, as just described, it engages a lever 146 which is fixed on a shaft 148 extending to the outside of the panel board 88 where it has fixed thereto an arm 150. On this arm is flexibly mounted a contact 152 cooperating with a fixed contact 154 carried by the post 122. The shaft 148 is tensioned by a spring so that it causes contacts 152 and 154 to remain in engagement except when the lever 146 is raised by means of the pin 78. The shaft 134 has secured thereto a cam 156 which engages one arm of a rigid bell-crank lever 158 pivoted on the outside of the panel 88 at 160 and formed with a contact 162 on its other arm. A spring 164 normally urges the arm 166 of lever 158 into engagement with the cam 156. The contact 162 is adapted to cooperate with a contact 168 which is carried on an arm 170 secured to the above described arm 112. When the shaft 134 is moved through 90° to support the valve in partially open position by means of lever 138, the cam 156 will assume the position shown in Figures 9 and 10 thereby to rotate lever 158 in such manner as to cause contacts 162 and 168 to engage and to rotate lever 112 into position to cause contacts 118 and 120 to engage.

Figure 7:
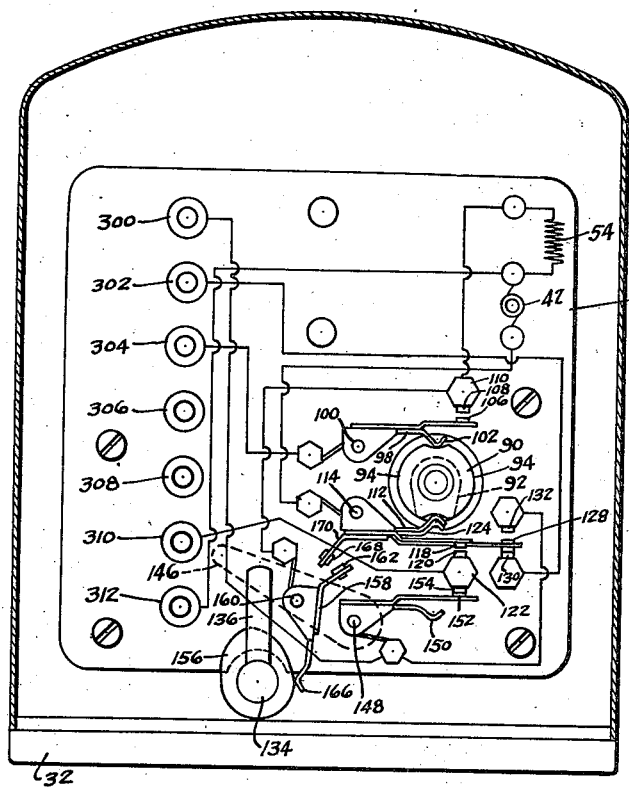
Figure 7 is a front view of the panel for the electrical contacts showing the positions of the parts when the valve is closed under normal conditions of operation and also showing the internal wiring of the instrument.

The various contacts assume the positions indicated in Figure 7 when the cam 50 is positioned as shown in Figure 1 and the valve is closed as also shown therein. When the motor has rotated gear wheel 48 sufficiently to move the valve into open position by means of cam 50, as shown in full lines in Figure 2, the contacts will assume the relative positions shown in Figure 8. However, if the parts are in the positions shown in Figures 2 and 8 and a power failure occurs followed by a manual opening of the valve, the contacts will assume the relative positions shown in Figure 9. If a power failure occurs while the valve is closed and the gear 48 is in the position shown in Figure 1, and the valve is then manually opened, the contacts will assume the various positions illustrated in Figure 10.

Figure 12:
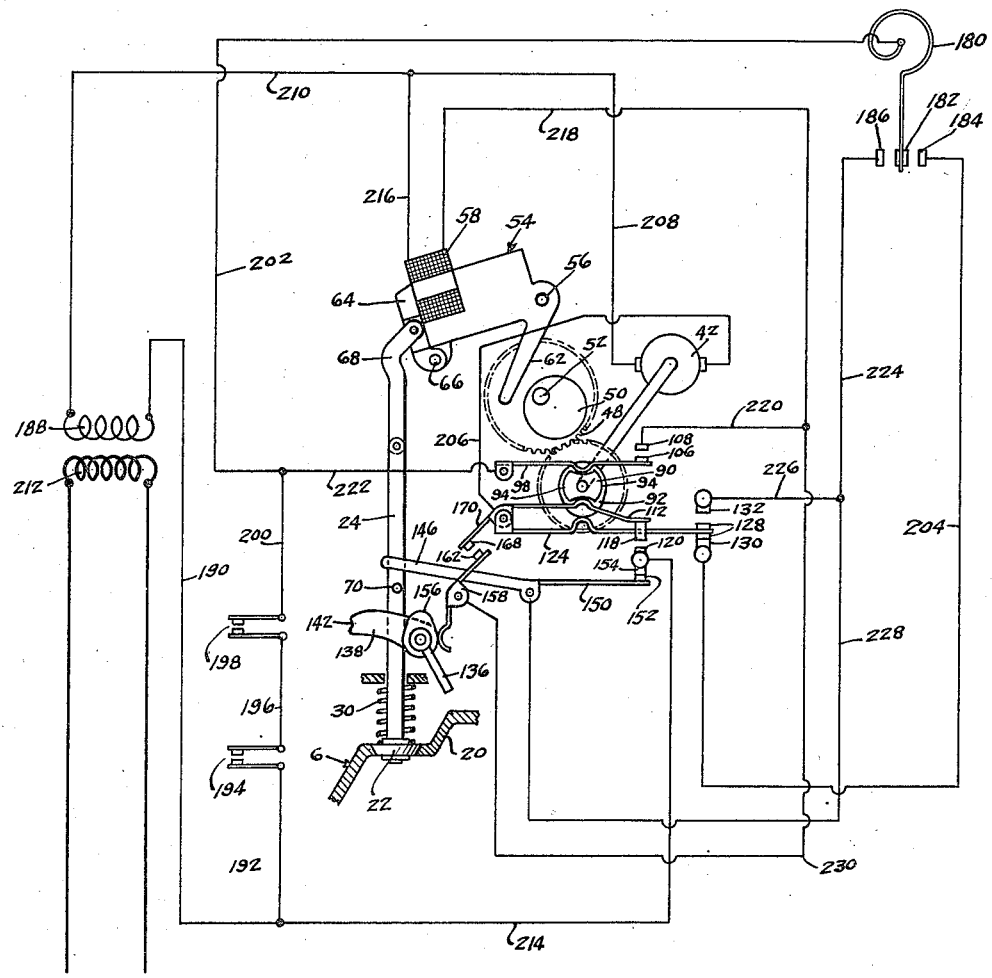
Figure 12 is a system diagram showing the wiring of the control circuit where a double contact thermostat is used, and where it is desired to cause the valve to close slowly when desired room temperature is reached.

The operation will be described first with particular reference to Figure 12 which shows a conventional 3-wire thermostat and a system so wired that the valve will close slowly when the space to be heated has reached the desired temperature. Assuming that the valve is closed and that the various parts occupy the relative positions shown in Figure 1, the cams 90 and 92 and the various contacts on the panel 88 assume the positions shown in Figure 7 and diagrammatically illustrated in Figure 12. Referring more particularly to Figure 12, the bimetallic element 180 of the room thermostat carries a double face contact 182 which is shown positioned midway between the contacts 184 and 186 and the room is therefore at desired temperature under which condition the valve is closed as indicated. When the space 12 becomes cold, the bimetallic element 180 will move contact 182 into engagement with contact 184 to set up the following initial energizing circuit for the motor 42: secondary of transformer 188, wire 190, wire 192, limit control 194 (any desired type of limit control), wire 196, safety pilot 198, wire 200, wire 202, bimetallic element 180, contact 182, contact 184, wire 204, contact 130, contact 128, lever 124, wire 206, motor 42, wire 208, and wire 210 back to secondary of transformer 188. The secondary 188 of the transformer cooperates with a primary 212 which is connected into a live line.

As the motor rotates, upon the setting up of this initial energizing circuit, the cams 90 and 92 will begin to rotate and the cam 50 will also rotate towards its position in which it raises the pivoted electro-magnet 54. After the cams 90 and 92 have rotated a small amount, the cam 90 will depress the arm 112 and cause maintaining switch contacts 118 and 120 to engage. This results in the setting up of the following maintaining circuit for the motor to insure that the motor will remain energized for a sufficient length of time to move the cams 90 and 92, and consequently the cam 50, through 180° independently of the room thermostat contacts: secondary of transformer 188, wire 190, wire 214, contact 120, contact 118, lever arm 112, wire 206, motor 42, wire 208, wire 210, and back to secondary of transformer 188. Since the room thermostat contacts are not included in this circuit, the motor will rotate the cams 50, 90 and 92 through 180° once it has started, even though the room thermostat contacts should become separated. In fact the initial energizing circuit is broken shortly after the cams begin to rotate due to separation of contacts 128 and 130 upon displacement of cam 92. The room thermostat contacts thus only carry the load for the motor for a short time during the beginning of the cycle of operation.

An energizing circuit for the coil 58 of electro-magnet 54 is also set up shortly after the cams 90 and 92 begin to rotate and lever arm 98 has been raised so that contacts 106 and 108 engage. This energizing circuit is as follows: secondary of transformer 188, wire 210, wire 216, electro-magnetic coil 58, wire 218, wire 220, contact 108, contact 106, lever arm 98, wire 222, wire 200, safety pilot 198, wire 196, limit control 194, wire 192, and wire 190, back to secondary of transformer 188. As before stated, the motor continues to operate until the cams 50, 90 and 92 operate 180° from the position shown in Figure 12. During the course of this operation the cam 50 raises the electro-magnet 54 and the armature 64 will follow the same because of the fact that the coil 58 is energized. Therefore, the valve will be moved into open position by means of the cam or eccentric 50. Just as the cams reach their position in which cam 50 has fully raised the electro-magnet 54 and consequently fully opened the valve which is being controlled, the lever 112 rides off the concentric edge 94 of cam 90, and drops into one of the notches or recesses thereby allowing contacts 118 and 120 to separate and break the secondary energizing circuit of the motor 42. At this stage the circuit which initially energized motor 42 has already been broken due to separation of contacts 128 and 130 as previously explained. The contacts assume the relative positions shown in Figure 8, wherein the contacts 106 and 108 are held in engagement by cam 92. Coil 58 therefore remains energized.

Closing of the contacts 182 and 184 when the parts are in the positions shown in Figure 12 thus results in the setting up of a condition wherein the electro-magnet 54 is raised and energized, the armature 64 is held adjacent thereto, the valve is open and the motor 42 is de-energized. The valve cannot run the motor and gear train backwards and return to closed position under the influence of spring 30 because the cam 50 is on dead center with respect to the lever 62.

If it be assumed that the valve is open and the parts are in the positions described above, and that the room heats until contacts 182 and 184 separate, there will be no action in the system. When the room heats to such a degree that the thermostat will move contacts 182 and 186 into engagement, however, the following initial energizing circuit for motor 42 will be set up: secondary of transformer 188, wire 190, wire 192, limit control 194, wire 196, safety pilot 198, wire 200, wire 202, bimetallic element 180, contact 182, contact 186, wire 224, wire 226, contact 132, contact 128, lever arm 124, wire 206, motor 42, wire 208, and wire 210 to secondary of transformer 188.

After the cams 90 and 92 have rotated a small amount from the positions shown in Figure 8, the lever 112 rides up on a concentric edge 94 of cam 90 and moves contacts 118 and 120 into engagement to set up the following motor energizing circuit which is independent of the room thermostat 180: secondary of transformer 188, wire 210, wire 208, motor 42, wire 206, lever arm 112, contact 118, contact 120, wire 214 and wire 190 back to secondary 188. As the motor rotates it will operate to slowly rotate cam 50 to the position shown in Figure 12 and will therefore slowly allow the electro-magnet 54 to descend from raised position to the position shown in Figure 12. Since the contacts 106 and 108 are held in engagement by a concentric surface 94 of cam 90 during return of the parts to the position shown in Figure 12, the coil 58 will remain energized through its previously described circuit during this period with the result that armature 64 will be held adjacent the electro-magnet 54 during the entire time and the valve will be closed very slowly. As the parts return to the positions shown in Figure 12 the energizing circuit of coil 58 will be broken because of separation of contacts 106 and 108 when arm 98 drops into a notch of cam member 90 as shown in Figure 12. The energizing circuit for motor 42 will also be broken because lever 112 will drop into the opposite notch and allow contacts 118 and 120 to separate, and the valve will be completely closed. At the same time the cam 92 has depressed lever arm 124 so that contacts 128 and 130 are in engagement and the circuit for initially energizing the motor upon re-engagement of contacts 182 and 184 due to temperature drop, is prepared. The parts will be positioned as shown in Figure 12 and the system ready for a new cycle of operation.

If it now be assumed that a power failure occurs while the parts are in the position illustrated in Figure 12, there will be no action in the system. The valve will of course remain closed as long as the power failure persists even though the room thermostat is calling for heat. On the other hand, if a power failure occurs while the cam 50 is holding electro-magnet 54 in raised position and the valve is open, the coil 58 will become de-energized and the armature 64 will drop thus allowing the valve to be closed instantly under the action of spring 30. As the valve closes under this spring action the lever 146 is allowed to drop so that the contacts 152 and 154 may engage as shown in Figure 12. In other respects the contacts are positioned as shown in Figure 8. Upon resumption of power the motor is energized through the following circuit which is independent of the room thermostat and other controls: secondary of transformer 188, wire 210, wire 208, motor 42, wire 206, lever arm 124, contact 128, contact 132 (these contacts are of course closed under these conditions), wire 226, wire 228, lever arm 150, contact 152, contact 154, wire 214, and wire 190 to secondary of transformer 188.

When the cams have rotated a slight amount, contacts 118 and 120 will close to set up the following circuit which is independent of contacts 128 and 132 which contacts will be separated later by cam 92: secondary of transformer 188, wire 190, wire 214, contact 120, contact 118, lever arm 112, wire 206, motor 42, wire 208, and wire 210 back to secondary 188. The motor will remain energized by means of this circuit until the cams 50, 90 and 92 together with the other parts are brought back into the positions shown in Figure 12 whereupon the room thermostat automatically takes over control of the valve. That is to say, if the room thermostat is calling for heat at this time, the necessary motor energizing circuit through contacts 182 and 184 is completed and the valve is opened, but if the room is at the desired temperature the parts merely remain as they are. This is also true if the contacts 186 and 182 are in engagement.

Figure 10:
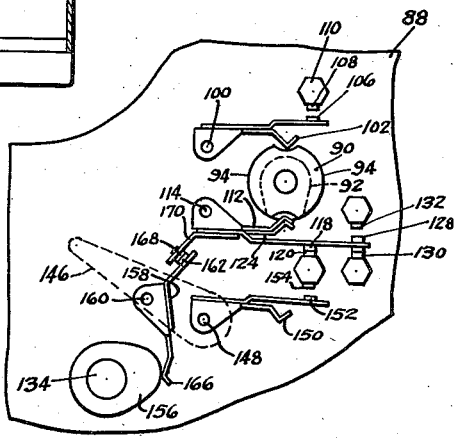
Figure 10 is likewise a similar view showing the positions of the contacts after the valve is manually opened following power failure which occurred while the motor was positioned to allow the valve to close.

If it now be assumed that power failure occurs while the parts are in the position shown in Figure 12 and that the operator then partially opens the valve manually by means of the handle 136, the cam 156 will rotate lever arm 158 in counter-clockwise direction so that contacts 162 and 168 will engage. Upon engagement of these contacts followed by continued rotation of lever 158 in counter-clockwise direction, the lever 112 will be rotated in clockwise direction and will move away from the notch or recess in cam 90 and cause contacts 118 and 120 to engage. At the same time lever arm 150 will be rotated in clockwise direction, due to engagement between pin 70 and lever 146, and contacts 152 and 154 will be separated. The position of the contacts under these conditions is illustrated in Figure 10. The valve is thus partially open and when power is resumed the following motor energizing circuit is set up for the purpose of again automatically placing the entire system under the control of the room thermostat: secondary of transformer 188, wire 210, wire 208, motor 42, wire 206, lever arm 112, contact 118, contact 120, wire 214 and wire 190 back to transformer 188.

When the valve is raised upon rotation of handle 136 and consequent engagement of pin 70 and arm 138 as before described, an upward force is exerted against the link 68 whereby the armature 64 is securely pushed into engagement with the electro-magnet 54 which is partially raised as a result. Thus, upon resumption of power after the valve has been manually opened under these circumstances, the armature 64 will be in physical engagement with the core of electro-magnet 54 whose coil 58 is energized by means of the following circuit: secondary of transformer 188, wire 210, wire 216, energizing coil 58, wire 218, wire 230, lever arm 158, contact 162, contact 168, arm 170, arm 112, contact 118, contact 120, wire 214, and wire 190 back to transformer 188.

Thus, when power is again continued, the motor will operate to move electro-magnet 54 into the raised position shown in Figure 2 and since the coil 58 is energized, the armature 64 will be retained in engagement with the electro-magnet and the valve will be fully opened. During the raising of the valve, the pin 70 will be raised out of engagement with the notch 142 on the end of lever 138 with the result that lever 138 will be released and will rotate into the position shown in Figure 12, together with cam 156. This results in separation of contacts 162 and 168 although contacts 118 and 120 will remain in engagement because of the fact that arm 112 is riding on one of the concentric edges 94 of the cam 90 and the motor circuit will not be broken. The coil 58 will remain energized in spite of the separation of the contacts 162—168 through the following circuit which includes contacts 106 and 108, closed by the cam 90: secondary of transformer 188, wire 210, wire 216, magnet coil 58, wire 218, wire 220, contact 108, contact 106, lever arm 98, wire 222, wire 200, safety pilot 198, wire 196, limit control 194, wire 192, and wire 190 back to secondary 188.

When the valve is thus fully opened, the cams 90—92 will be rotated 180° from the position shown in Figure 12 and the relay coil 58 will remain energized through the circuit just described since contacts 106 and 108 are held closed by cam 92. However, the arm 112 is dropped into one of the notches of cam 90 thereby to cause separation of contacts 118 and 120 and the motor will be de-energized unless the room happens to be so hot that contacts 182 and 186 are in engagement. When the valve reaches fully open position, the system is therefore again under complete control of the room thermostat and the means for manually raising the valve are automatically returned to inoperative position. The contacts are as shown in Figure 8.

If it now be assumed that power failure occurs while the valve is being held open as illustrated in Figure 2, the cams 50, 90 and 92 will be 180° from their positions shown in Figure 12, the electro-magnet 54 will be raised, and armature 64 will be dropped to allow the valve to move into closed position under the action of spring 30. If the valve is then partially opened by means of the manually operated handle 136, the armature 64 will remain separated from the core of electro-magnet 54 and the various contacts on the panel board will assume the positions illustrated in Figure 9.

When power is resumed the motor will be energized by means of the following circuit: secondary of transformer 188, wire 210, wire 208, motor 42, wire 206, lever 112, contact 118, contact 120, wire 214, and wire 190, back to transformer 188. The contacts 118 and 120, which control this motor circuit, will remain continuously in engagement as long as the lever 138 remains in position to mechanically hold the valve open, and the lever 138 will remain in such position until the motor has rotated cam 50 through nearly 360°. This is true because of the fact that the armature 64 was separated from the electro-magnet upon resumption of power and the magnet cannot operate to fully raise the valve and release lever 138 until cam 50 returns to the position shown in Figure 12, thereby to cause armature 64 to be mechanically placed in engagement with electro-magnet 54, and has then rotated nearly 180° additionally in order to raise electro-magnet 54 together with armature 64 and the valve stem with the result that pin 70 is raised above notch 142 on the end of lever 138 thereby to release the latter. The release of lever 138 will not cause separation of contacts 118 and 120. These will remain in engagement until the cam 50 has completed the full revolution of 360° and fully raised the valve because of the fact that arm 112 rides on one of the concentric surfaces 94 of the cam 90 at the instant when lever 138 is released. After the completion of the 360° of revolution, it will be obvious that the system is again under the complete control of the room thermostat.

Thus, when the system is wired as shown in Figure 12, the valve is always returned from open to closed position slowly under normal conditions of operation. Also, the valve is always automatically returned from open to closed position upon the occurrence of power failure and it is further to be noted that although means for manually opening the valve upon power failure are provided, the control of the valve is automatically taken over by the room thermostat upon resumption of power, irrespective of the positions of the parts when power failure occurred. The system provides complete safety as against power failure, enables manual control of the valve during power failure, and insures resumption of complete automatic control upon recurrence of power even though the valve has been manually opened.

The system illustrated in Figure 13 results in a quick closing of the valve whenever the room thermostat indicates that desired room temperature has been reached. The operation of the system when wired as shown in Figure 13 will now be described, reference being had particularly to this figure wherein reference numerals like those in Figure 12 have been used wherever possible.

When the room is at desired temperature, the valve is closed and the contacts 182 and 184 are open, the various parts being in the relative positions shown in Figure 13 under normal conditions of operation. If the room now becomes cold, the contacts 182 and 184 move into engagement to set up the following circuit for initially energizing the motor 42: secondary of transformer 188, wire 190, wire 192, limit control 194, wire 196, safety pilot 198, wire 202, room thermostat 180, contact 182, contact 184, wire 204, contact 130, contact 128, lever 124, wire 206, motor 42, wire 208, and wire 210, back to secondary 188.

After the motor has operated for a short time, the lever arm 112 will ride on one of the concentric edges 94 of cam 90 and maintaining switch contacts 118 and 120 will be closed in order to set up the following motor energizing circuit which is independent of the room thermostat 180 and thereby insures the completion of a half revolution on the part of the cams 90—92, and cam 50, independently of the room thermostat: transformer 188, wire 190, wire 214, contact 120, contact 118, lever 112, wire 206, motor 42, wire 208, wire, 210, and secondary of transformer 188.

When the cam 90 has rotated sufficiently to lift lever 98 and move contacts 106 and 108 into engagement, the following circuit for energizing the magnet coil 58 is set up so that armature 64 will be held in engagement with the core of electro-magnet 54 and the valve will be opened upon a raising of the electro-magnet by means of the cam 50: secondary of transformer 188, wire 190, wire 192, limit control 194, wire 196, safety pilot 198, wire 202, thermostat 180, contact 182, contact 184, wire 204, wire 232, lever arm 98, contact 106, contact 108, wire 220, wire 218, energizing coil 58, wire 216 and wire 210 back to secondary of transformer 188. It will be noted that the limit control and the safety pilot as well as the thermostat are in the relay energizing circuit. Any of these may therefore operate to de-energize the relay and close the valve in the same manner as upon the occurrence of power failure.

After the cams 50, 90 and 92 are rotated through 180° by the motor 42, the cam or eccentric 50 has fully raised the electro-magnet 54 together with its armature 64 with the result that the valve has been fully opened against the action of its spring 30 which urges it into closed position. At this stage of operation the lever 112 drops into one of the notches or recesses formed in cam member 90 thereby to break the motor energizing circuit and it will be noted that the initial energizing circuit of the motor was previously broken upon separation of contacts 128 and 130 due to rotation of cam 92 away from the position shown in Figure 13. The contacts 106 and 108 will not be separated at this 180° position, or "open" position, but will be held in engagement by the cam 92.

When the valve is open, therefore, the motor is deenergized, coil 58 is energized, the room thermostat contacts 182 and 184 are in engagement, the remaining contacts are in the positions indicated in Figure 8, and the cam 50 and electro-magnet 54 assume the full line positions shown in Figure 2. The valve is unable to reverse the motor and close under the action of spring 30 because of the position of the cam 50 which is on dead center with respect to the roller 76 on the arm 62 of the electro-magnet.

If it now be assumed that the room has become heated to the desired temperature due to opening of the valve, contacts 182 and 184 will separate thereby breaking the energizing circuit for coil 58 with the result that the armature 64 will drop down into the dotted line position shown in Figure 2 and allow the valve to be closed under the action of spring 30. Thus, the closing of the valve will occur very quickly and abruptly. When the valve was in raised position the pin 70 engaged the lever 146 and thereby held contacts 154 and 152 out of engagement as illustrated in Figure 8 but upon closure of the valve the pin 70 drops away from lever 146 and the arm 150 rotates under the influence of its spring to move contact 152 into engagement with contact 154 and set up the following circuit for initially energizing the motor for the purpose of returning the cams to their positions shown in Figure 13: secondary of transformer 188, wire 210, wire 208, motor 42, wire 206, lever 124, contact 128, contact 132 (these contacts are closed under these conditions), wire 228, lever arm 150, contact 152, contact 154, wire 214 and wire 190 back to secondary of transformer 188. After the cams have rotated a small amount, the cam 90 depresses lever 112 so that contacts 118 and 120 move into engagement. Later the cam 92 depresses lever arm 124 thereby separating contacts 128 and 132 and breaking the circuit for initially energizing the motor just described. However, the motor will remain energized until the parts are back in the position shown in Figure 13 by means of the following circuit which includes the contacts 118 and 120: transformer 188, wire 210, wire 208, motor 42, wire 206, lever arm 112, contact 118, contact 120, wire 214, wire 190, and secondary of transformer 188. Upon completion of the half revolution of cams 90 and 92 the lever arm 112 drops back into the notch in cam 90 as shown whereupon contacts 118 and 120 are separated and the motor 42 is deenergized. All of the parts are then in the position shown in Figure 13 and the system is ready for the next cycle of operation. Thus, in normal operation the room will become cold as a result of the closing of the valve, contacts 182 and 184 of the room thermostat will engage, and the valve will again be opened as described above.

Upon the occurrence of power failure while the electromagnet 54 is in raised position and the valve is open, the armature 64 simply drops and allows the valve to close under the action of spring 30 in the same manner as this occurs upon the opening of contacts 182 and 184 of the room thermostat in normal operation. Upon resumption of power, the motor rotates the cams through 180° to return the parts to their positions shown in Figure 13, as already described, and place the system under complete control of the thermostat.

Thus, if contacts 182 and 184 are separated the parts remain as in Figure 13, but if the room is cold the valve is automatically opened by the motor as in normal operation.

If it now be assumed that power failure occurs while the parts are in the positions shown in Figure 13 and that the valve is then partially opened by means of the manually operated lever 136, the various contacts on the panel board will assume the positions illustrated in Figure 10 and the armature 64 will be in engagement with the core of electro-magnet 54 as explained in connection with the operation of the system shown in Figure 12. Upon resumption of current while the parts are so arranged, the motor 42 will be initially energized by means of the following circuit: secondary of transformer 188, wire 210, wire 208, motor 42, coil 206, lever arm 112, contact 118, contact 120, wire 214, and wire 190 back to secondary of transformer 188. After the motor has moved the cams an amount sufficient to rotate electro-magnet 54 to the extent that pin 70 will be moved out of engagement with lever 138, the magnet coil being energized by a circuit to be described later, the lever 138 will be released, and contacts 162 and 168 will be separated. However, the contacts 118 and 120 will be held in engagement by means of the cam 90 and the motor will continue to be energized by the initial energizing circuit above described so that the cams 50, 90 and 92 will at least be rotated through 180° into "open" position.

As soon as the motor is energized as just described, the coil 58 of electro-magnet 54 becomes energized by means of the following circuit which is independent of the room thermostat but is dependent upon the manually closed contacts 162 and 168: secondary of transformer 188, wire 210, wire 216, energizing coil 58, wire 218, wire 230, lever arm 158, contact 162, contact 168, arm 170, lever arm 112, contact 118, contact 120, wire 214, and wire 190 back to secondary or transformer 188. Due to the energization of coil 58 the armature 64 will remain in engagement with the core of the electro-magnet and the valve will be raised upon rotation of cam 50. When the magnet rotates sufficiently to lift pin 70 out of engagement with the manually operated lever 138, this lever and its co-operating cam 156 drop back into the positions shown in Figure 13 and the contacts 162 and 168 separate, thereby breaking the energizing circuit for the magnet coil 58 which has just been described.

Assuming that the contacts 182 and 184 of the room thermostat are open at this instant, the coil 58 will become de-energized, armature 64 will drop away from the electro-magnet 54, and the valve will quickly close under the action of spring 30, but the opening of contacts 162 and 168 will not interfere with the motor energizing circuit. On the contrary the motor will continue to be energized until all of the parts are back in the positions shown in Figure 13. The motor energizing circuits for the first half of the revolution of the cams have just been described and the energizing circuits for the last half of the revolution are the same as those described in connection with normal operation upon separation of contacts 182 and 184 when the room reaches desired temperature. Thus, in the event the room thermostat is not calling for heat, the valve will automatically be closed and all of the parts will assume the positions shown in Figure 13 wherein the room thermostat is in full control, upon resumption of power.

If it be assumed, however, that the room thermostat was calling for heat at the instant when the pin 70 released the lever 138, the electromagnet 58 would not become de-energized due to the separation of contacts 162 and 168 but would remain energized through the following circuit which includes the contacts 182 and 184 of the room thermostat: secondary of transformer 188, wire 210, wire 216, magnet coil 58, wire 218, wire 220, contact 108, contact 106, lever arm 98, wire 232, wire 204, contact 184, contact 182, thermostat 180, wire 202, safety pilot 198, wire 196, limit control 194, wire 192 and wire 190 back to transformer 188. Due to the continued energization of coil 58, armature 64 will remain attracted by the electro-magnet 54 and the valve will move into fully open position. When the valve is thus fully opened, the parts will be positioned just as they are when the thermostat is calling for heat and the valve is fully opened under normal conditions of operation. The manually controlled lever 138 will be moved back into the position shown in Figure 13 under the action of its spring and the system will be under complete and normal control of the room thermostat. It will be noted that the circuit for energizing the coil 58 until such time as pin 70 is raised a sufficient amount to release lever 138 is completed irrespective of the condition of the room thermostat. Thus, the means for manually setting the valve open are always released upon the resumption of power, and full control is immediately assumed by the thermostat.

If it be assumed that power failure occurs while the thermostat is calling for heat and the valve is being held open by the electro-magnet 54, and that the operator thereafter manually rotates lever 138 to partially open the valve, the position of the contacts will be those illustrated in Figure 9 and the armature 64 will be separated from the electro-magnet 54. Upon the resumption of power the motor will be energized through the following circuit: secondary of transformer 188, wire 210, wire 208, motor 42, wire 206, lever arm 112, contact 118, contact 120, wire 214, and wire 190 back to secondary of transformer 188. This circuit will cause rotation of the motor until the cams rotate 180° to reach the positions shown in Figure 13 at which time the armature 64 will be mechanically moved into engagement with the core of electro-magnet 54. That is to say, the cams and electro-magnet will occupy the dotted line positions shown in Figure 5 and the contacts will assume the positions shown in Figure 10 wherein the contacts 118 and 120 are in engagement even though a notch on cam member 90 is opposite the arm 112. The motor will therefore continue to be energized by means of the circuit just described above thereby to rotate the cams another 180° into the position which they occupy when the valve is opened under normal conditions of operation and without the aid of the manually controlled lever 138. During the course of this rotation, the energizing coil 58 will continue to be energized, the armature 64 will remain attracted by the electro-magnet 54, and the valve will be raised toward fully open position. When the pin 70 rises clear of the notch in the end of lever 138, this lever will move into the position shown in Figure 13, together with its co-operating cam 156, and cause separation of contacts 162 and 168. However, contacts 118 and 120 will not separate and cause deenergization of the motor inasmuch as the lever arm 112 will be riding on one of the concentric edge surfaces of the cam member 90. The motor operates until the valve is fully open whereupon the entire system is again under the control of the room thermostat.

Since the thermostat was calling for heat in the operation just described, the coil 58 remained energized when the valve reached open position and the motor 42 became deenergized. On the other hand, if the contacts of the thermostat had been disengaged, the coil 58 would have become de-energized, and the various parts would have returned to the positions indicated in Figure 13 as in normal operation.

While quick closing of the valve has been described in connection with a simple two-wire thermostat it will be obvious that quick closing can, if desired, also be obtained with a thermostat providing for a temperature differential between opening and closing of the valve.

A thermostat having two contacts which are sequentially closed on a temperature drop as shown in Figure 15 may be substituted for the thermostat in Figure 13. As far as possible corresponding parts of Figure 15 carry the same numbers as in Figure 13. On a temperature drop contact 256 engages contact 258 but this of itself does not energize the relay for the circuit is broken by contacts 106 and 108. On a still further temperature drop contact 182 engages contact 184 which operates the motor for a half cycle as explained in connection with Figure 13. The relay is now energized through a circuit including contacts 256 and 258 and will therefore hold the valve open until these contacts are separated by a temperature rise.

In the case of both the two-wire thermostat shown in Figure 13 and the three-wire thermostat shown in Figure 12, the operation of any of the limit controls or safety pilot affects the instrument in exactly the same way as power failure since it causes de-energization of the relay and the motor will not subsequently operate to open the valve until the limit control is again placed back to normal.

Whenever the electro-magnet 54 is rotated about its pivot 56, it will be apparent from Figures 1 and 2 that the lever 80 will be rocked and that the shaft 82 which is secured thereto will also be correspondingly rocked. The secondary air draft damper 10, which is shown in Figure 11, is opened and closed by means of a lever 240 which is secured to the shaft 82. Thus, the damper 10 is moved into open position whenever the valve is open and is moved into closed position whenever the valve is closed. As a result of this no secondary air draft may circulate through the combustion chamber when combustion is not taking place and all of the heat within the combustion chamber is conserved.

As shown in Figure 6, a mercury switch 250 is mounted in a holder fixed on the side of the electro-magnet 54. When the electro-magnet is in the position shown in Figure 1 the circuit across the contacts of the mercury switch is open and when the electro-magnet is in the position shown in Figure 2, the position of the mercury switch is such that the circuit across the electrodes is closed. The mercury switch controls the energizing circuit of the motor 252 of a warm air circulating fan 9 which is energized through a circuit which includes the power supply 254 and the mercury switch 250 connected by suitable circuit conductors. Thus, when the valve is closed the mercury switch 250 holds the energizing circuit of the warm air circulating fan motor open but when the valve is held open by means of electromagnet 54, the mercury switch closes a gap in the circuit for the fan motor. Thus, the fan will not operate to circulate hot air except when combustion is taking place. It will of course be understood that any other of the conventional limit controls may be included in the circuit of the warm air circulating fan motor.

In commercial practice, the instrument comprising the motorized valve above described is internally wired as illustrated in Figure 7. By properly selecting the external connections a system like that shown in Figure 12, Figure 13 and Figure 15 may be selectively set up as follows:

If the instrument is to form part of a system as shown in Figure 12, binding post 300 is connected to thermostat contact 186, and post 302 is connected to thermostat contact 184. Post 304 is connected to the bimetal 180 and the safety pilot and limit control are connected in series across posts 304 and 310. The transformer secondary 188 is connected across posts 310 and 312.

If the instrument is used in a system such as shown in Figure 13, posts 302 and 304 are both connected to fixed thermostatic contact 184. The post 306 is connected to bimetal 180. The limit control and safety pilot are connected in series between posts 306 and 310. The transformer secondary 188 is connected across posts 310 and 312.

If the instrument is used in a system such as shown in Figure 15, post 302 is connected to the fixed thermostat contact 184, and post 304 is connected to the fixed thermostatic contact 258, post 306 is connected to the bimetallic blade 180. The limit control and safety pilot are connected in series between posts 306 and 310. The transformer secondary 188 is connected across posts 310 and 312.

In the following claims, reference to valves will be understood to cover any desired types of heat control members such as dampers and the like. Also, references in the claims to "closed position" of the valve will be understood to include also any desired predetermined position of the valve in which it causes the heater to supply a minimum supply of heat.

I claim as my invention:

1. In combination, a heater, a member controlling the heat supplied thereby, an electric motor, means responsive to a heater condition for controlling said electric motor, means including an electro-magnet connecting said motor and said heat control member to move the latter between a position in which it supplies a lesser amount of heat and a position in which it supplies a greater amount of heat, means associated with said positioning means for returning said heat control member to its position in which it causes the heater to supply a lesser amount of heat upon the occurrence of power failure while said member is in position to supply a greater amount of heat, and manually operable means for setting said heat control member in a position in which it supplies a greater amount of heat while such power failure obtains.

2. In combination, a heater, a valve controlling the heat supply and biased to move to closed position, a thermostat, and means controlled by the thermostat and including an electric motor and an electro-magnet the energization of which is controlled by the thermostat for positioning the valve, said means being operative to position the valve only when the electro-magnet is energized and being inoperative to hold the valve open when the electro-magnet is de-energized, whereby the valve is automatically returned to closed position whenever the electro-magnet becomes de-energized while the valve is open.

3. In combination, a heater, a valve controlling the operation of the heater and biased to move to closed position, a thermostat, and means controlled by the thermostat and including an electric motor and an electro-magnet the energization of which is controlled by the thermostat adapted to be connected to a common current source for positioning the valve, said means being operative to move the valve away from closed position only when the electro-magnet is energized and being inoperative to hold the valve open when the electro-magnet is deenergized, whereby the valve is automatically returned to closed position upon the occurrence of power failure while the valve is open.

4. In combination, a heater, a member controlling the heat supplied thereby, a thermostat in the space heated by said heater, a motor controlled by the thermostat, an electro-magnet positioned by said motor, an armature adapted to be engaged with the electro-magnet by the motor and to be held by said electro-magnet when the latter is energized, and means connecting said armature and heat control member for positioning the latter.

5. In combination, a valve, means biasing said valve to closed position, a control switch comprising a pair of contacts adapted to be closed, an electric motor controlled by the switch, an electro-magnet, circuit conductors adapted to interconnect said switch contacts, motor and electromagnet to a common source of electrical energy, means associated with said motor and electro-magnet for moving the valve from closed to open position when the switch contacts are closed, means for disconnecting said motor from the energy source when it has moved the valve to open position, means associated with said electro-magnet for holding the valve in open position while the motor is deenergized, means for again energizing the motor when the switch contacts are open, means associated with said motor and electro-magnet for slowly returning the valve from open to closed position, said electro-magnet being operative to release the valve for movement into closed position under the influence of the biasing means and independently of the motor upon the occurrence of power failure, means for manually setting said valve in an open position against its bias during such power failure, and means for rendering said manual means inoperative and automatically returning the valve to the control of the switch upon the resumption of power.

6. In combination, a valve, means biasing the valve to closed position, a control switch comprising a pair of contacts adapted to be closed, an electric motor, an electro-magnet adapted to operatively connect said motor and valve when energized and disconnect the same when de-energized, circuit conductors adapted to interconnect said switch contacts, motor and electro-magnet to a common source of electrical energy, means associated with said motor and electro-magnet for moving said valve from closed to open position and maintaining the same in such position when the switch contacts are closed, means for disconnecting said electro-magnet from the source of electrical energy when the switch contacts are opened thereby to release said valve from the motor for quick closure under the influence of said biasing means, and means for again energizing the motor when the valve is thus closed.

7. In combination, a valve, means biasing the valve to closed position, a control switch comprising a pair of contacts adapted to be closed, an electric motor, an electro-magnet adapted to operatively connect the valve and motor when energized and to operatively disconnect the same so that the valve may move independently of the motor when deenergized, circuit conductors adapted to interconnect said switch contacts, motor and electro-magnet to a common source of electrical energy, means associated with said motor and electro-magnet for moving the valve from closed to open position upon closure of the switch contacts and for maintaining the same in such position until the switch contacts are opened, means for disconnecting said motor from the energy source when the valve reaches open position, said valve being adapted to move from open to closed position independently of the motor upon the occurrence of a power failure with consequent de-energization of said electro-magnet, means for manually setting said valve in open position after such power failure, and means for rendering said manual means inoperative and automatically returning said valve to the control of the switch upon the resumption of power.

8. In combination, a heater, a valve for controlling the heat supply and biased to closed position, a thermostat adapted to close a pair of contacts when the temperature of the medium adjacent the thermostat falls below a desired value, an electric motor, an electro-magnet adapted to operatively connect the valve and motor when energized and to operatively disconnect the same so that the valve may move independently of the motor when de-energized, circuit conductors adapted to interconnect said thermostat contacts, motor and electro-magnet to a common source of electrical energy, means associated with said motor and magnet for moving said valve from closed to open position upon closure of the thermostat contacts and for maintaining the same in such position while these contacts are closed and the current source is operative, means for disconnecting said motor from the energy source when the valve reaches open position, means for manually setting the valve in open position after the occurrence of a power failure while the space being heated is at desired temperature and the valve is closed, and means for automatically rendering said manual means inoperative and returning the valve to the control of the thermostat upon the resumption of power.

9. In combination, a heater, a valve for controlling the heat supply and biased to closed position, a thermostat adapted to close a pair of contacts when the temperature of the medium adjacent the thermostat falls below a desired value, an electric motor, an electro-magnet adapted to operatively connect the valve and motor when energized and to operatively disconnect the same so that the valve may move independently of the motor when de-energized, circuit conductors adapted to interconnect said thermostat contacts, motor and electro-magnet to a common source of electrical energy in a manner whereby the energization of the motor and electro-magnet are under the control of the thermostat, means associated with said motor and magnet for moving the valve from closed to open position and maintaining the same in such position during engagement of the thermostat contacts, means for disconnecting said motor from the energy source after the valve reaches open position, and means for automatically restoring the valve to the control of the thermostat upon the resumption of power after the valve has dropped from open to closed position upon the occurrence of a power failure and consequent de-energization of the electro-magnet.

10. In combination, a valve casing, a valve movable therein between an open and a closed position to regulate the passage of fluid therethrough, means for biasing the valve to closed position, an electric motor mounted upon the valve casing, an electro-magnet pivoted with respect to the valve casing, means connecting the motor and magnet for imparting pivotal movement to the latter upon actuation of the former, an armature associated with said magnet and movable relative thereto when de-energized but held by the magnet when energized, and means connecting the armature and valve for positioning the latter, said armature being released by the electro-magnet and the valve being free to move to closed position under the influence of its biasing means upon the occurrence of power failure and consequent de-energization of the magnet.

11. In combination, a valve casing, a valve movable therein between an open and a closed position to regulate the passage of fluid therethrough, a spring for biasing the valve to closed position, an electric motor mounted on the valve casing, an electro-magnet pivoted with respect to the valve casing, an armature for the magnet, said magnet being of sufficient strength to forcibly retain the armature adjacent thereto but of insufficient strength to attract the armature to itself when appreciably spaced therefrom, means connecting the motor and electro-magnet for raising and lowering the latter upon rotation of the former, and means connecting the armature and valve for raising the valve upon a raising of the electro-magnet, said last named means further being operative to mechanically move the armature into engagement with the electro-magnet upon a lowering of the electro-magnet by the motor.

12. In combination, a heater, a heat control member for controlling the heat supply, means biasing the heat control member to heat diminishing position, a device responsive to a condition produced by the heater and adapted to open and close a pair of contacts, a motor under the control of said condition responsive device, electrically operated means adapted to operatively connect said motor and heat control member when energized and disconnect the same when de-energized, circuit conductors adapted to interconnect said device contacts and electrically operated means to a common source of electrical energy, means associated with said motor and electrically operated means for moving said heat control member from heat diminishing position to heat increasing position and maintaining the same in such position when the device contacts are closed, means for disconnecting said electrically operated means from the source of electrical energy when the device contacts are opened in response to the heater condition thereby to release said heat control member from the motor for quick movement to heat diminishing position under the influence of said biasing means.

13. A heat control system including in combination, a member to be controlled and which is biased to a first position, a control member, switching means movable to closed position upon movement of the control member, electric motor means, an electro-magnet adapted to operatively connect said motor means and controlled member when energized and disconnect the same when de-energized, circuit conductors interconnecting the switching means, motor means and electro-magnet to a common source of electrical energy in a manner whereby the motor means and electro-magnet are under the control of the switching means, means associated with said motor means and electro-magnet for initiating movement of said controlled member toward a second position when said switching means is moved to closed position by said control member, maintaining switching means operated to closed position upon initial movement of said motor means whereby said motor means is maintained energized independently of said first mentioned switching means, and means for operatively de-energizing said motor means when the controlled member has been moved to its second position, said electro-magnet being operative to release the controlled member for movement to its first position under its bias and independently of the motor means upon the occurrence of a power failure.

14. In combination, a heater, a heat control member movable between open and closed positions and biased to closed position, a thermostat adapted to close a first pair of contacts when cold and a second pair of contacts when hot, there being an intermediate temperature at which neither pair of contacts is closed, electric motor means controlled by said pairs of contacts, an electro-magnet adapted to operatively connect said motor means and heat control member when energized and disconnect the same when de-energized, circuit conductors inter-connecting the pairs of contacts, motor means and electro-magnet to a common source of electrical power whereby the motor means and electro-magnet are controlled by said pair of contacts, circuits for the motor means controlled by said cold pair of contacts and said hot pair of contacts for causing opening and closing of said heat control member, and maintaining switching means operated upon initial movement of said motor means for maintaining the particular motor circuit independently of the cold or hot pair of contacts as the case may be, said electro-magnet being operative to release said heat control member for movement to closed position independently of the motor means upon the occurrence of a power failure.

15. A valve for controlling the flow of fuel to a gas fired furnace, electro-responsive means for operating said valve, a circuit including a source of current supply and a thermostatic switch connected to control the operation of said electro-responsive means, manually operable means arranged to operate said valve when said circuit is deenergized and to be automatically rendered inactive when the circuit is energized, a switch arranged to be operated by said manually operable means and to shunt said thermostatic switch when said valve is moved by the manually operable means, and a second switch arranged to be closed by said electro-responsive means when energized and to cooperate with said thermostatic switch when the latter is heated above a predetermined temperature to deenergize said electro-responsive means.

16. In combination, a fluid flow controlling member, means biasing the fluid flow controlling member into a position wherein a minimum flow of fluid is permitted, a motor, an electro-magnet positioned by the motor, an armature pivotally connected with respect to the electro-magnet and adapted to be held in contact therewith when the latter is energized, and a link pivotally connected to the armature and also connected to the heat control member for positioning the latter.

17. A fluid flow controlling element, an electrical actuator therefor, an electro-magnet positioned by said actuator, an armature adapted to be engaged with the electro-magnet by the actuator to be held by said electro-magnet when the latter is energized, means connecting said armature and fluid flow controlling element for positioning the latter, and control means for controlling the energization of said actuator and said electro-magnet to effect movement of said fluid flow controlling element between different flow controlling positions.

18. In combination, a fluid flow controlling element biased to one flow controlling position, a switch movable from a first to a second circuit controlling position, electrical actuating means, an electro-magnet adapted to operatively connect said actuating means and said element when energized and disconnect the same when deenergized, means controlled by said switch for connecting said actuating means and said electro-magnet to a common source of electrical energy and operative upon movement of said switch from said first to said second circuit controlling position to cause said actuating means to move said element to a second flow controlling position against its bias and to maintain the same in such position while said switch is in its second circuit controlling position, said means being operative upon return of said switch to said first circuit controlling position to disconnect said electro-magnet from the source of electrical energy thereby to release the fluid flow controlling element from the actuating means for quick return to the first mentioned position by its bias, and means for again energizing said actuating means when the element reaches said first mentioned position to return said actuating means to substantially its original position.

19. In combination, a fluid flow controlling element biased to one position, an electrical actuator for the same, means operatively connecting said actuator and said fluid flow controlling element comprising two elements movable away from each other and an electrically operated holding means for holding said elements together, switching means including a control switch operative upon movement of said switch in one direction to cause energization of both said actuator and of said holding means to cause said actuator to move said element to a second flow controlling position, said switching means being operative upon said control switch being moved in the opposite direction to effect return of said element to said first position and to deenergize said holding means before said switching means terminates its operation.

20. In combination, a valve, an electric motor for actuating the same, means comprising an electro-magnet adapted to operatively connect the valve and motor when energized and to operatively disconnect the same so that the valve may move independently of the motor when deenergized, switching means including a main control switch operative upon movement of said switch to one circuit controlling position to cause energization of both said motor and said electromagnet to cause said motor to open said valve and to deenergize said motor upon said valve reaching open position, said switching means being operative upon said control switch being moved to a different circuit controlling position to cause return of said valve to closed position and to deenergize said electro-magnet before said switching means terminates its operation.

21. A valve of the character described, comprising a casing having a passageway therethrough, a valve member in said casing and controlling flow through said passageway, automatic means operable to move said valve member toward open position, a thrust member operable to move said valve member toward open position, a rotatable shaft, normally inactive cam means carried by said shaft and operable on said thrust member upon rotation of said shaft, and a spring having one end fixed and having its other end acting on said shaft, said thrust member having means cooperating with said cam means to hold said shaft against rotation by said spring upon opening movement of said valve member by said cam means, said spring acting to move said cam means to inactive position upon movement of said valve member by said automatic means.

22. A valve of the character described, comprising a casing having a passageway therethrough, a valve member in said casing and controlling flow through said passageway, a stem on said valve member, electrically energized means cooperable with said stem to move said valve member toward open position, a thrust member operable to move said valve member toward open position, a rotatable shaft, normally inactive cam means carried by said shaft and operable on said thrust member upon rotation of said shaft, and a helical spring having one end fixed and having its other end acting on said shaft, said spring surrounding said shaft, said thrust member having means cooperating with said cam means to hold said shaft against rotation by said spring upon movement of said valve member by said cam means, said spring acting to move said cam means to inactive position upon movement of said valve member by said electrically energized means.

23. In combination, a temperature changing means, a regulator for said temperature changing means biased to a predetermined position in which said temperature changing means is least active, a thermostat, and means controlled by the thermostat for positioning the regulator and including an electric motor and electromagnetically controlled means, the energization of which is controlled by the thermostat, said positioning means being operative to position the valve only when the electromagnetically controlled means is energized and being inoperative to hold the regulator away from said predetermined position when the electromagnetically controlled means is deenergized, whereby the regulator is automatically returned to said predetermined position whenever the electromagnetically controlled means becomes deenergized while the regulator is in other than said predetermined position.

24. In a temperature control system, a temperature changing means, a regulating device for said temperature changing means normally tending to assume a position in which said temperature changing means is least active, electric driving means for said device, electromagnetically controlled means operative when energized to maintain a driving relation between said device and said driving means, said electromagnetically controlled means being releasable upon deenergization thereof to permit of movement of the device independently of the driving means, a thermostat comprising a thermostatic element and first and second switches sequentially closed in the order named upon a temperature change in one direction, an energizing circuit for said electromagnetically controlled means controlled by said first switch, and a regulating circuit for said driving means controlled by said second switch and effective when closed to cause said driving means to move said regulating device in a direction to increase the temperature changing effect of said temperature changing device.

25. In a temperature control system, a temperature changing means, a regulating device for said temperature changing means normally tending to assume a position in which said temperature changing means is least active, thermostatically controlled electric driving means for said device, electromagnetically controlled means normally energized to maintain a driving relation between said device and said driving means but releasable to permit of movement of the device independently of the driving means, and means responsive to the movement of said driving means for controlling the energization of said electromagnetically controlled means.

26. In a temperature control system, a temperature changing means, a regulating device for said temperature changing means movable in opposite directions between maximum and minimum temperature changing positions to regulate the operation of said temperature changing means and normally tending to move to said minimum temperature changing position, an electrically driven operator for moving said device in opposite directions and having a connection therewith adapted when released to permit of independent movement of the device to minimum temperature changing position, thermostatic means in the space whose temperature is to be controlled, a switch adapted to be closed by said thermostatic means when the temperature is at one predetermined value and controlling said operator to cause movement of said device toward said minimum temperature changing position, a second switch adapted to be closed by said thermostatic means when the temperature is at a different predetermined value and controlling said operator to cause movement of said device toward maximum temperature changing position, and means operative during the movement of said operator caused by the closure of said first mentioned switch to release said connection automatically.

27. In combination, a main burner, a pilot burner, a valve controlling the flow of fuel to said main burner, means biasing said valve to closed position, an armature connected to said valve, an electromagnet adapted to hold said armature and said valve in valve open position against the action of said biasing means, but incapable of moving said armature into engagement therewith when released, means responsive to the temperature of the pilot burner for controlling the energization of said electromagnet, and means for moving said electromagnet into engagement with said armature when the latter has been released and subsequently moving said electromagnet, said armature, and said valve to valve open position, if said electromagnet is again reenergized.

28. In combination, a heater, a member controlling the heat supplied thereby and biased to one extreme position, a first temperature responsive means responsive to one controlling temperature condition, a motor controlled by the thermostat, an electromagnet, means including a second temperature responsive means responsive to a different temperature condition for controlling the energization of the electromagnet, an armature adapted to be engaged with the electromagnet by the motor and adapted to be held by said electromagnet against the action of the biasing means when the electromagnet is energized, and means connecting said armature and heat control member for positioning the latter.

29. In combination, a main fluid fuel burner, a pilot burner, a member controlling the flow of fuel to said main burner, means biasing said member to a first position in which flow of fuel to the main burner is prevented, means for holding said member in a second position in which flow of fuel to the burner is permitted, said holding means including an armature and an electromagnet one of which is connected to said member, means including a device responsive to the temperature of the pilot burner operative when the pilot burner is ignited to energize the electromagnet sufficiently to hold said electromagnet and armature together but insufficiently to move them together, and means for moving said electromagnet and armature together while preventing the flow of gas to the burner until the armature and electromagnet are retained in engagement with each other as the result of the energization of the electromagnet.

CLIFFORD HOTCHKISS.